United States Patent
Yu et al.

(10) Patent No.: US 11,962,950 B2
(45) Date of Patent: Apr. 16, 2024

(54) HDR FILM SOURCE PLAYING METHOD, DEVICE AND STORAGE MEDIUM

(71) Applicant: SHENZHEN SKYWORTH-RGB ELECTRONIC CO., LTD., Shenzhen (CN)

(72) Inventors: Peng Yu, Shenzhen (CN); Yarong Hou, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 192 days.

(21) Appl. No.: 17/527,568

(22) Filed: Nov. 16, 2021

(65) Prior Publication Data

US 2022/0078387 A1 Mar. 10, 2022

Related U.S. Application Data

(63) Continuation of application No. PCT/CN2020/113913, filed on Sep. 8, 2020.

(30) Foreign Application Priority Data

Feb. 20, 2020 (CN) .......................... 202010107053.9

(51) Int. Cl.
*H04N 9/73* (2023.01)
*G06T 5/00* (2006.01)
(Continued)

(52) U.S. Cl.
CPC .............. *H04N 9/73* (2013.01); *G06T 5/007* (2013.01); *H04N 9/69* (2013.01); *H04N 21/443* (2013.01);
(Continued)

(58) Field of Classification Search
CPC .......... H04N 23/741; H04N 9/73; H04N 9/69; H04N 23/88; H04N 23/841; H04N 23/84; G06T 2207/20208; G06T 5/007
See application file for complete search history.

(56) References Cited

U.S. PATENT DOCUMENTS

| 2010/0321396 A1* | 12/2010 | Xu | ............................. G06F 3/14 345/520 |
| 2011/0188744 A1* | 8/2011 | Sun | ...................... H04N 23/741 382/162 |

(Continued)

FOREIGN PATENT DOCUMENTS

| CN | 104820537 A | 8/2015 |
| CN | 105957498 A | 9/2016 |

(Continued)

OTHER PUBLICATIONS

First Office Action issued in counterpart Chinses Patent Application No. 202010107053.9, dated Mar. 1, 2021.
(Continued)

*Primary Examiner* — Dismery Mercedes
(74) *Attorney, Agent, or Firm* — Westbridge IP LLC

(57) ABSTRACT

Disclosed is an HDR film source playing method. The method includes following operations: determining state information of a color temperature control switch according to an application that is currently opened; playing an HDR film source on the application according to a color temperature of a display screen when the state information is on; and playing the HDR film source according to a color temperature corresponding to the application when the state information is off. Further disclosed are an HDR film source playing device and a computer-readable storage medium.

17 Claims, 4 Drawing Sheets

(51) Int. Cl.
  *H04N 9/69* (2023.01)
  *H04N 21/443* (2011.01)
  *H04N 23/741* (2023.01)
  *H04N 23/84* (2023.01)
  *H04N 23/88* (2023.01)
(52) U.S. Cl.
  CPC ........... *H04N 23/741* (2023.01); *H04N 23/84* (2023.01); *H04N 23/841* (2023.01); *H04N 23/88* (2023.01); *G06T 2207/20208* (2013.01)

(56) References Cited

U.S. PATENT DOCUMENTS

| | | | | |
|---|---|---|---|---|
| 2014/0333656 | A1* | 11/2014 | Wang | G09G 5/10 345/589 |
| 2015/0135250 | A1* | 5/2015 | James | H04N 21/8166 725/116 |
| 2015/0339986 | A1* | 11/2015 | Lee | G09G 3/20 345/690 |
| 2016/0358346 | A1* | 12/2016 | Hendry | H04N 1/6061 |
| 2018/0077453 | A1* | 3/2018 | Oh | H04N 21/816 |
| 2018/0130446 | A1* | 5/2018 | Guest | G09G 3/3413 |
| 2018/0139434 | A1 | 5/2018 | Roe et al. | |
| 2018/0330674 | A1 | 11/2018 | Baar et al. | |
| 2020/0029062 | A1* | 1/2020 | Shi | G09G 5/026 |
| 2022/0130315 | A1* | 4/2022 | Thai | G06T 1/20 |

FOREIGN PATENT DOCUMENTS

| | | |
|---|---|---|
| CN | 106227496 A | 12/2016 |
| CN | 106233706 A | 12/2016 |
| CN | 106502605 A | 3/2017 |
| CN | 106603853 A | 4/2017 |
| CN | 107295325 A | 10/2017 |
| CN | 107690811 A | 2/2018 |
| CN | 108184020 A | 6/2018 |
| CN | 108600724 A | 9/2018 |
| CN | 110706673 A | 1/2020 |
| CN | 111294655 A | 6/2020 |
| KR | 20050054730 A | 6/2005 |
| WO | 2014130213 A1 | 8/2014 |
| WO | 2015178710 A1 | 11/2015 |

OTHER PUBLICATIONS

Hu, Design of control system for automatic white balance and color temperature in laser display, Master Dissertation of China Jiliang University, dated Jun. 30, 2018.
International Search Report and Written Opinion issued in corresponding PCT Application No. PCT/CN2020/113913, dated Nov. 30, 2020.
Examination Report issued in counterpart Indian Patent Application No. 202127053248, dated Nov. 16, 2022.
Extended European Search Report issued in counterpart European Patent Application No. 20920444.5, dated Dec. 16, 2022.
Holly, Windows 10 Tip: Find out how to get HDR video on your PC, retrieved from the Internet: https://web.archive.org/web/20181207173204/https://blogs.windows.com/windowsexperience/2018/08/27/windows-10-tip-find-out-how-to-get-hdr-video-on-your-pc//, dated Dec. 7, 2018, retrieved on Dec. 8, 2022.

* cited by examiner

HDR FILM SOURCE PLAYING METHOD, DEVICE AND STORAGE MEDIUM

CROSS-REFERENCE TO RELATED APPLICATIONS

This application is a continuation application of PCT Application No. PCT/CN2020/113913, filed on Sep. 8, 2020, which claims priority to Chinese Patent Application No. 202010107053.9, filed on Feb. 20, 2020, and entitled "HDR FILM SOURCE PLAYING METHOD, DEVICE AND STORAGE MEDIUM", the entire disclosure of which are incorporated herein by reference.

TECHNICAL FIELD

The present disclosure relates to the technical field of image processing and display, and in particular to a high-dynamic range (HDR) film source playing method, an HDR film source playing device, and a computer-readable storage medium.

BACKGROUND

Nowadays, HDR film sources of most of display devices and APPs generally use the color temperature of D65 for display. For example, Amazon's Prime Video must require the color temperature of D65 to pass HDR10 quality certification. Generally, when playing HDR film sources at D65 color temperature, the overall background is warmer and yellowish. However, in response to customer application requirements, some APPs, such as Netflix, require that the white displayed under HDR film sources be consistent with Netflix's background white. When switching from Prime Video to Netflix, it is necessary to quickly convert the HDR color temperature to the color temperature of the screen. However, at present, all APPs are in the same image mode, the software only calls a set of Gamma values and a set of white balance. Therefore, it is not feasible to achieve HDR color temperature switching through different Gamma values or different white balances corresponding to different APPs.

The above contents are only used to assist the understanding of the technical solutions of the present disclosure, which does not mean that the above contents are recognized as prior art.

SUMMARY

The main objective of the present disclosure is to provide an HDR film source playing method, an HDR film source playing device, and a computer-readable storage medium, which aims to solve the problem of difficulty in switching color temperature quickly when different applications play HDR film sources in the prior art.

In order to achieve the above objective, the present disclosure provides an HDR film source playing method, including following operations:

determining state information of a color temperature control switch according to an application that is currently opened;
playing an HDR film source on the application according to a color temperature of a display screen when the state information is on; and
playing the HDR film source according to a color temperature corresponding to the application when the state information is off.

In an embodiment, the operation of determining state information of a color temperature control switch according to an application that is currently opened includes:

determining whether the color temperature required by the application to play the HDR film source is consistent with the color temperature of the display screen;
when the color temperature required by the application to play the HDR film source is consistent with the color temperature of the display screen, determining state information of a color temperature conversion switch to be on; and
when the color temperature required by the application to play the HDR film source is inconsistent with the color temperature of the display screen, determining the state information of the color temperature conversion switch to be off.

In an embodiment, the operation of playing an HDR film source on the application according to a color temperature of a display screen includes:

obtaining a color temperature parameter of the display screen;
configuring a current color temperature parameter according to the color temperature parameter of the display screen to obtain a configured first color temperature parameter; and
playing the HDR film source on the application according to the first color temperature parameter.

In an embodiment, the operation of playing the HDR film source on the application according to the first color temperature parameter includes:

generating a first gamma curve according to the first color temperature parameter;
performing color temperature correction according to the first gamma curve to obtain a corrected first color temperature; and
playing the HDR film source on the application according to the first color temperature.

In an embodiment, the operation of obtaining a color temperature parameter of the display screen includes:

correcting the color temperature of the display screen according to a preset gamma value to obtain a color temperature parameter corresponding to a corrected color temperature;
determining the color temperature parameter corresponding to the corrected color temperature as the color temperature parameter of the display screen; and
obtaining the determined color temperature parameter of the display screen.

In an embodiment, the operation of playing the HDR film source according to the color temperature corresponding to the application includes:

determining a color temperature parameter of the color temperature required by the application to play the HDR film source;
configuring a current color temperature parameter according to the color temperature parameter of the color temperature required to play the HDR film source, to obtain a configured second color temperature parameter; and
playing the HDR film source on the application according to the second color temperature parameter.

In an embodiment, the operation of playing the HDR film source on the application according to the second color temperature parameter includes:

generating a second gamma curve according to the second color temperature parameter;

performing color temperature correction according to the second gamma curve to obtain a corrected second color temperature; and playing the HDR film source on the application according to the second color temperature.

In an embodiment, the operation of determining state information of a color temperature control switch according to an application that is currently opened includes:

determining that the state information of the color temperature control switch is on when the application is Netflix; and determining that the state information of the color temperature control switch is off when the application is Prime Video.

Besides, in order to achieve the above objective, the present disclosure further provides an HDR film source playing device, including a memory, a processor, and an HDR film source playing program stored in the memory and executable on the processor, when the HDR film source playing program is executed by the processor, the operations of the HDR film source playing described above are implemented.

Besides, in order to achieve the above objective, the present disclosure further provides a computer-readable storage medium, an HDR film source playing program is stored in the computer-readable storage medium, when the HDR film source playing program is executed by a processor, the operations of the HDR film source playing described above are implemented.

In an embodiment of the present disclosure, the state information of the color temperature control switch is determined according to the application that is currently opened. An HDR film source is played on the application according to the color temperature of the display screen when the state information is on; and the HDR film source is played according to the color temperature corresponding to the application when the state information is off. Therefore, only the state information of the color temperature control switch can be determined to meet the color temperature requirements of different applications when playing HDR film sources, and the color temperature can be quickly switched.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, and are not intended to limit the present disclosure.

The main solutions of the present disclosure are: determining state information of a color temperature control switch according to an application that is currently opened; playing an HDR film source via the application according to a color temperature of a display screen when the state information is on; and playing the HDR film source according to a color temperature corresponding to the application when the state information is off.

When the current display device is playing HDR film sources, it cannot meet the color temperature requirements of different applications, and realize the rapid conversion of the color temperature when the applications are switched. Therefore, the present disclosure provides an HDR film source playing method, an HDR film source playing device, and a computer-readable storage medium, the method including following operations: determining state information of a color temperature control switch according to an application that is currently opened; playing an HDR film source on the application according to a color temperature of a display screen when the state information is on; and playing the HDR film source according to the color temperature corresponding to the application when the state information is off. Thus, the color temperature control switch can not only realize the rapid conversion of color temperature, but also can meet the color temperature requirements of different applications to play HDR film sources when the applications are switched.

Figure 1:
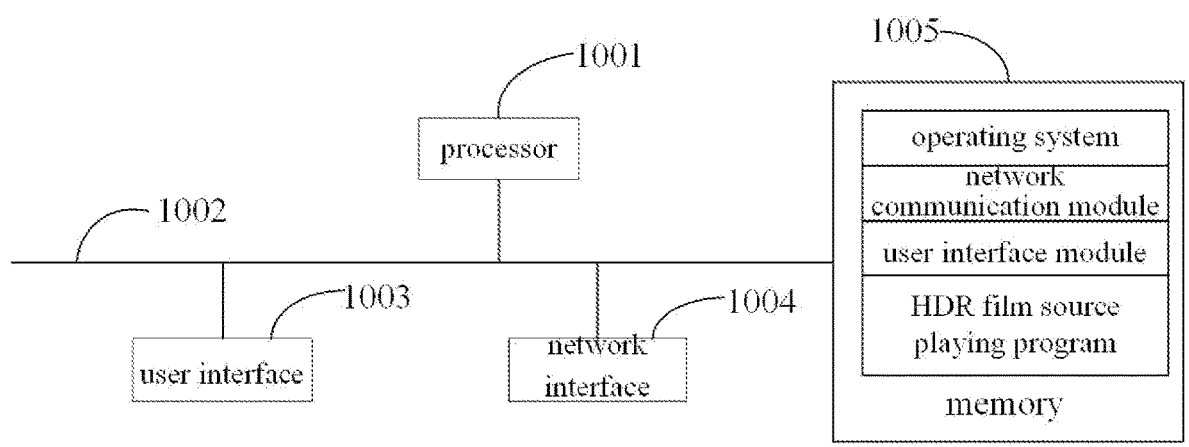
FIG. 1 is a schematic structural diagram of an HDR film source playing device in a hardware operating environment involved in a solution of an embodiment of the present disclosure.

As shown in FIG. 1, FIG. 1 is a schematic structural diagram of an HDR film source playing device in a hardware operating environment involved in a solution of an embodiment of the present disclosure. The HDR film source playing device can include a communication bus 1002, a processor 1001, such as a CPU, a user interface 1003, a network interface 1004, and a memory 1005. The communication bus 1002 is configured to implement communication between the components. The user interface 1003 can include a display, an input unit such as a keyboard. The user interface 1003 can also include a standard wired interface and a wireless interface. The network interface 1004 can further include a standard wired interface and a wireless interface (such as a WI-FI interface). The memory 1005 can be a high-speed random access memory (RAM) or a non-volatile memory, such as a magnetic disk memory. The memory 1005 can also be a storage device independent of the foregoing processor 1001.

In an embodiment, the HDR film source playing device can also include a camera, a Radio Frequency (RF) circuit, a sensor, an audio circuit, a WiFi module, and so on. The sensor can be, for example, a light sensor, a motion sensor, and other sensors. Specifically, the light sensor can include an ambient light sensor and a proximity sensor. The ambient light sensor can adjust the brightness of the display according to the brightness of the ambient light. The proximity sensor can turn off the display and/or the backlight when the mobile terminal is moved to the ear. A gravity acceleration sensor, as a kind of motion sensor, can detect the magnitude of acceleration in various directions (usually three axes). The gravity acceleration sensor can detect the magnitude and direction of gravity when it is stationary, and can be configured to identify the gesture of the mobile terminal (such as horizontal and vertical screen switching, related games, magnetometer attitude calibration), vibration recognition related functions (such as pedometer, tap), etc. Of course, the mobile terminal can also be configured with other sensors such as a gyroscope, a barometer, a hygrometer, a thermometer, an infrared sensor, and the like, which will not be repeated here.

Those skilled in the art should understand that the terminal structure shown in FIG. 1 does not constitute a limitation on the HDR film source playing device, which can include more or fewer components, a combination of some components, or differently arranged components than shown in the figure.

As shown in FIG. 1, the memory 1005 as a computer storage medium can include an operating system, a network communication module, a user interface module, and a HDR film source playing program.

In the HDR film source playing device shown in FIG. 1, the network interface 1004 is mainly configured to connect to a background server and perform data communication with the background server. The user interface 1003 is mainly configured to connect to a client and perform data communication with the client. The processor 1001 can be configured to call the HDR film source playing program stored in the memory 1005, and perform the following operations:

determining state information of a color temperature control switch according to an application that is currently opened;

playing an HDR film source on the application according to a color temperature of a display screen when the state information is on; and playing the HDR film source according to a color temperature corresponding to the application when the state information is off.

In an embodiment, the processor 1001 can call the HDR film source playing program stored in the memory 1005, and further perform the following operations:

determining whether the color temperature required by the application to play the HDR film source is consistent with the color temperature of the display screen;

when the color temperature required by the application to play the HDR film source is consistent with the color temperature of the display screen, determining state information of a color temperature conversion switch to be on; and when the color temperature required by the application to play the HDR film source is inconsistent with the color temperature of the display screen, determining the state information of the color temperature conversion switch to be off.

In an embodiment, the processor 1001 can call the HDR film source playing program stored in the memory 1005, and further perform the following operations:

obtaining a color temperature parameter of the display screen;

configuring a current color temperature parameter according to the color temperature parameter of the display screen to obtain a configured first color temperature parameter; and playing the HDR film source on the application according to the first color temperature parameter.

In an embodiment, the processor 1001 can call the HDR film source playing program stored in the memory 1005, and further perform the following operations:

generating a first gamma curve according to the first color temperature parameter;

performing color temperature correction according to the first gamma curve to obtain a corrected first color temperature; and playing the HDR film source on the application according to the first color temperature.

In an embodiment, the processor 1001 can call the HDR film source playing program stored in the memory 1005, and further perform the following operations:

correcting the color temperature of the display screen according to a preset gamma value to obtain a color temperature parameter corresponding to a corrected color temperature;

determining the color temperature parameter corresponding to the corrected color temperature as the color temperature parameter of the display screen; and obtaining the determined color temperature parameter of the display screen.

In an embodiment, the processor 1001 can call the HDR film source playing program stored in the memory 1005, and further perform the following operations:

determining a color temperature parameter of the color temperature required by the application to play the HDR film source;

configuring a current color temperature parameter according to the color temperature parameter of the color temperature required to play the HDR film source, to obtain a configured second color temperature parameter; and playing the HDR film source on the application according to the second color temperature parameter.

In an embodiment, the processor 1001 can call the HDR film source playing program stored in the memory 1005, and further perform the following operations:

generating a second gamma curve according to the second color temperature parameter;

performing color temperature correction according to the second gamma curve to obtain a corrected second color temperature; and playing the HDR film source on the application according to the second color temperature.

In an embodiment, the processor 1001 can call the HDR film source playing program stored in the memory 1005, and further perform the following operations:

determining that the state information of the color temperature control switch is on when the application is Netflix; and determining that the state information of the color temperature control switch is off when the application is Prime Video.

Figure 2:
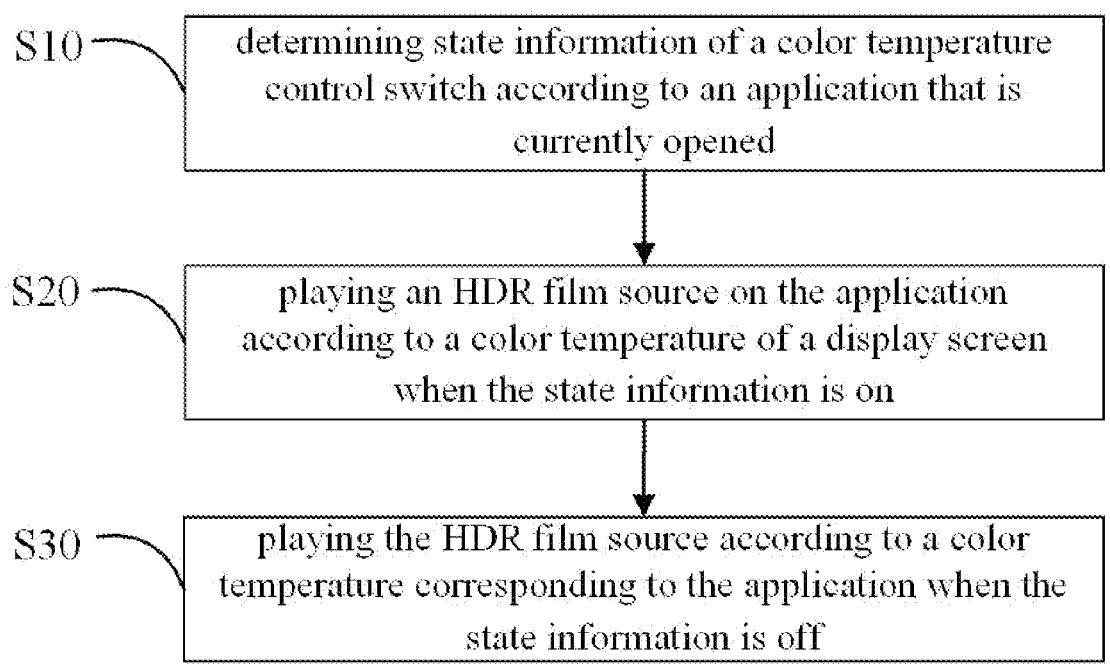
FIG. 2 is a schematic flowchart of an HDR film source playing method according to a first embodiment of the present disclosure.

As shown in FIG. 2, FIG. 2 is a schematic flowchart of an HDR film source playing method according to a first embodiment of the present disclosure. In this embodiment, the HDR film source playing method includes following operations:

Operation S10, determining state information of a color temperature control switch according to an application that is currently opened.

Although most applications usually use D65 color temperature (color temperature of 6500K) to play High-Dynamic Range (HDR) film sources, due to the yellowish background or white screen when playing HDR film source under D65 color temperature, and for the color temperature requirements of some applications when playing HDR film sources or for the color temperature requirements of some customers when playing HDR film sources, it is necessary to make the white screen displayed when the HDR film source is played and the background white display of the OSD Logo as consistent as possible. When playing HDR film sources, the color temperature of HDR should be quickly converted to the color temperature of the display screen for playback, so as to meet the requirements of current applications for color temperature. To achieve fast switching of color temperature, since usually only one set of gamma value and one set of white balance are used in the same image mode, different applications using different gamma values and white balances cannot achieve color temperature conversion. Therefore, in this embodiment, a color temperature control switch is provided, and when different applications are opened, the color temperature control switch is turned on and off to realize the rapid conversion of the color temperature. The color temperature control switch is especially a color temperature conversion macro or a flag bit. As long as different macro parameters or flag bits are set, the color temperature control switch can be turned on and off. For example, when the application is opened, if the color temperature required by the application to play the HDR film source is D65 color temperature, the color temperature control switch is turned off to play with D65 color temperature (usually set the D65 color temperature as the default color temperature). If the color temperature required by the application to play the HDR film source is the color temperature of the display screen, the color temperature control switch is turned on to play with the color temperature of the display screen. Therefore, before playing the HDR film source of the application, the state information of the color temperature control switch can be determined according to the currently opened application.

In a specific embodiment, the operation of determining state information of a color temperature control switch according to an application that is currently opened includes: determining whether the color temperature required by the application to play the HDR film source is consistent with the color temperature of the display screen; when the color temperature required by the application to play the HDR film source is consistent with the color temperature of the display screen, determining the state information of the color temperature conversion switch to be on; and when the color temperature required by the application to play the HDR film source is inconsistent with the color temperature of the display screen, determining the state information of the color temperature conversion switch to be off. According to the color temperature requirements of the customer or the color temperature requirements of the HDR film source played by the application, the color temperature required by the application to play the HDR film source can be determined. According to the color temperature setting or production information of the display screen, the color temperature of the display screen can be determined. Then, the color temperature required by the application to play the HDR film source is compared with the color temperature of the display screen. If the color temperature required by the application to play the HDR film source is consistent with the color temperature of the display screen, the state information of the color temperature conversion switch is determined to be on, and the HDR film source is played according to the color temperature of the display screen at this time. If the color temperature required by the application to play the HDR film source is inconsistent with the color temperature of the display screen, the state information of the color temperature conversion switch is determined to be off, at this time, the HDR playing is performed directly according to the color temperature required by the application to play the HDR film source.

Operation S20, playing the HDR film source on the application according to the color temperature of the display screen when the state information is on.

After the state information of the color temperature control switch is determined according to the currently opened application, the current color temperature can be switched according to different state information to meet the color temperature requirements of the current application when the HDR film source is played. Since most applications usually play HDR film sources at D65 color temperature, D65 color temperature is set as the default color temperature in this embodiment. As such, when the state information of the color temperature control switch is on, it means that the color temperature of the current application is inconsistent with the default color temperature (usually D65 color temperature), and it is necessary to use the color temperature of the display screen for playing the HDR film source. At this time, after turning on the color temperature control switch, only the color temperature data (especially color coordinates) of the video signal source needs to be consistent with the color temperature data of the display screen. When calling the color temperature data of the video signal source for playing the HDR film source, the HDR film source will be played with the color temperature of the display screen. When the state information of the color temperature control switch is on, according to the color temperature conversion macro or flag bit, the color temperature conversion macro or flag bit can be specified as specific landmark information (such as numbers, characters, or the like) to mark the state information of the color temperature control switch as on. For example, when the color temperature conversion macro or the flag is set to 1, it means that the state information of the color temperature control switch is on. In addition, the color temperature of the display screen can be obtained by measurement. After the color temperature data of the display screen is measured, the method for keeping the color temperature data of the video signal source consistent with the color temperature data of the display screen can be to directly write the color temperature data of the display screen into the color temperature variable of the video signal source, can also be that after detecting that the color temperature control switch is turned on, the color temperature data of the display screen can be equivalently replaced with the color temperature variable of the video signal source through the equivalent replacement of the variable.

Operation S30, playing the HDR film source according to the color temperature corresponding to the application when the state information is off.

When the state information of the color temperature control switch is off, it means that the color temperature of the current application is consistent with the default color temperature, that is, when the color temperature required by the current application to play HDR film source is consistent with the default color temperature, the HDR film source needs to be played with the default color temperature. At this time, after the color temperature control switch is turned off (the state information of the color temperature control switch is off), only the color temperature data (especially color coordinates) of the video signal source needs to be consistent with the default color temperature data, and when the color temperature data of the video signal source is called for playing the HDR film source, the HDR film source will be played using the default color temperature. Similarly, when the state information of the color temperature control switch is off, according to the color temperature conversion macro or flag bit, the color temperature conversion macro or flag bit can be specified as specific landmark information (such as numbers, characters, or the like) to mark the state information of the color temperature control switch as off. For example, when the color temperature conversion macro or the flag is set to 0, it means that the state information of the color temperature control switch is off. The method for keeping the color temperature data of the video signal source consistent with the default color temperature data (color coordinate) can be to directly write the color temperature data corresponding to the default color temperature into the color temperature variable of the video signal source, and can also be that after detecting that the color temperature control switch is turned on, the color temperature data corresponding to the default color temperature can be equivalently replaced with the color temperature variable of the video signal source through the equivalent replacement of the variable.

In this embodiment, the state information of the color temperature control switch is determined according to the application that is currently opened. HDR film source playing is performed on the application according to the color temperature of the display screen when the state information is on; and HDR film source playing is performed according to the color temperature corresponding to the application when the state information is off. In this way, when two applications are opened on the same display, the color temperature requirements of different applications can be met by controlling the on and off of the color temperature control switch, and when the applications are switched, it can quickly switch to the color temperature of the corresponding application for playing the HDR film source, which improves the efficiency of color temperature conversion.

Figure 3:
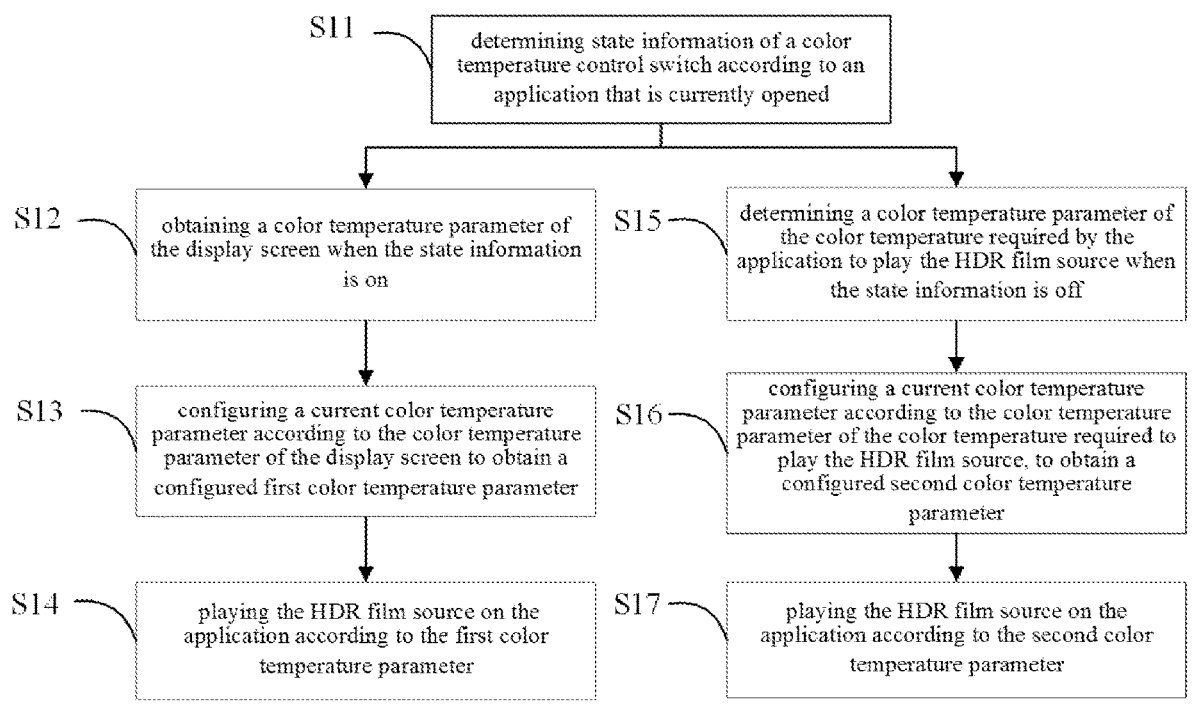
FIG. 3 is a schematic flowchart of the HDR film source playing method according to a second embodiment of the present disclosure.

As shown in FIG. 3, FIG. 3 is a schematic flowchart of the HDR film source playing method according to a second embodiment of the present disclosure. In this embodiment, the HDR film source playing method includes the following operations:

Operation S11, determining state information of a color temperature control switch according to an application that is currently opened;

Operation S12, obtaining a color temperature parameter of the display screen when the state information is on;

Operation S13, configuring a current color temperature parameter according to the color temperature parameter of the display screen to obtain a configured first color temperature parameter;

Operation S14, playing the HDR film source on the application according to the first color temperature parameter;

Operation S15, determining a color temperature parameter of the color temperature required by the application to play the HDR film source when the state information is off;

Operation S16, configuring a current color temperature parameter according to the color temperature parameter of the color temperature required to play the HDR film source, to obtain a configured second color temperature parameter; and Operation S17, playing the HDR film source on the application according to the second color temperature parameter.

In this embodiment, the color temperature required by the application to play the HDR film source is set as the default color temperature. The color temperature (for example, D65) required by the application to play the HDR film source is usually inconsistent with the color temperature of the display screen. Thus, when the color temperature required by the application to play the HDR film source is inconsistent with the color temperature of the display screen, the HDR film source can be played directly with the color temperature corresponding to the application, without turning on the color temperature control switch for color temperature conversion. When the color temperature required by the application to play the HDR film source is consistent with the color temperature of the display screen, the color temperature conversion switch needs to be turned on to convert the color temperature required for the application to play the HDR film source into the color temperature of the display screen.

Therefore, after determining the state information of the color temperature control switch according to the currently open application, if the state information is on, the color temperature parameter (especially the color coordinate) of the display screen is obtained, and the color temperature parameter of the display screen can be obtained by measurement. In a specific embodiment, the operation of obtaining a color temperature parameter of the display screen includes: correcting the color temperature of the display screen according to a preset gamma value to obtain a color temperature parameter corresponding to a corrected color temperature; determining the color temperature parameter corresponding to the corrected color temperature as the color temperature parameter of the display screen; and obtaining the determined color temperature parameter of the display screen. Usually, the default gamma value of Windows is 2.2. In this embodiment, the preset gamma value is set to 2.2, and the color temperature of the display screen is corrected with the preset gamma value, so that the image of the display is the same as the original scene without distortion. Then, according to the corrected color temperature parameter, the corrected color temperature parameter of the display screen is obtained, and the current color temperature parameter is automatically configured according to the corrected color temperature parameter of the display screen, to make the current color temperature parameter consistent with the color temperature parameter of the display screen after calibration, the first color temperature parameter after configuration is obtained. In this way, when the application is opened, the HDR film source is played using the first color temperature parameter, which can meet the image quality requirements of the application when the HDR film source is played, and display with the color temperature of the display screen.

In a specific embodiment, the operation of playing the HDR film source on the application according to the first color temperature parameter includes: generating a first gamma curve according to the first color temperature parameter; performing color temperature correction according to the first gamma curve to obtain a corrected first color temperature; and playing the HDR film source on the application according to the first color temperature. The first gamma curve is an HDR PQ Gamma curve generated according to the first color temperature parameter, that is, a perceptual quantization gamma curve for the HDR format, and the color temperature in the HDR format can be corrected by the HDR PQ Gamma curve. The color temperature correction is performed by using the first gamma curve to obtain a corrected first color temperature to ensure the reliability of the first color temperature, so as to have a better playback effect when playing the HDR film source of the application under the first color temperature.

When the state information of the color temperature control switch is off, it is necessary to perform HDR film source playing according to the color temperature corresponding to the application. First, it is necessary to determine the color temperature parameter of the color temperature required by the application to play the HDR film source. According to the color temperature requirements of the application for playing the HDR film source or the color temperature requirements of the customer when the application is playing the HDR film source, the color temperature required for the application to play the HDR film source can be determined. According to the determined color temperature, the corresponding color temperature parameter can be determined, that is, the color temperature parameter of the color temperature required by the application to play the HDR film source. The current color temperature parameter is automatically configured according to the color temperature parameter of the color temperature required to play the HDR film source, so that the current color temperature parameter is consistent with the color temperature parameter of the color temperature required by the application to play the HDR film source. After obtaining the configured second color temperature parameter, HDR film source playing is performed on the application according to the second color temperature parameter, which can meet the requirements for image quality when the application plays the HDR film source, and display with the color temperature of the display screen.

In a specific embodiment, the operation of playing the HDR film source on the application according to the second color temperature parameter includes: generating a second gamma curve according to the second color temperature parameter; performing color temperature correction according to the second gamma curve to obtain a corrected second color temperature; and playing the HDR film source on the application according to the second color temperature. The second gamma curve is an HDR PQ Gamma curve (a perceptual quantization gamma curve for HDR format) generated according to the second color temperature parameter. Similarly, the color temperature in the current HDR format can be corrected through the HDR PQ Gamma curve. The second gamma curve is used to perform color temperature correction to ensure the reliability of the second color temperature, and obtain the corrected second color temperature, such that the currently opened application plays the HDR film source under the second color temperature, which can not only meet the color temperature requirement of the currently opened application for playing the HDR film source, but also ensure the image quality during playing and enhance the user experience.

In this embodiment, the method includes: determining the state information of the color temperature control switch according to the currently opened application; when the state information is on, configuring the current color temperature parameter according to the color temperature parameter of the display screen to obtain a configured first color temperature parameter, playing the HDR film source on the application according to the first color temperature parameter; when the state information is off, configuring the current color temperature parameter according to the color temperature parameter of the color temperature required to play the HDR film source, to obtain a configured second color temperature parameter, and playing the HDR film source on the application according to the second color temperature parameter. As such, when the applications are switched, the color temperature control switch can be turned on and off as the sign information, and the color temperature can be quickly switched through the automatic configuration of parameters to meet the color temperature requirements of different applications when playing HDR film sources.

Figure 4:
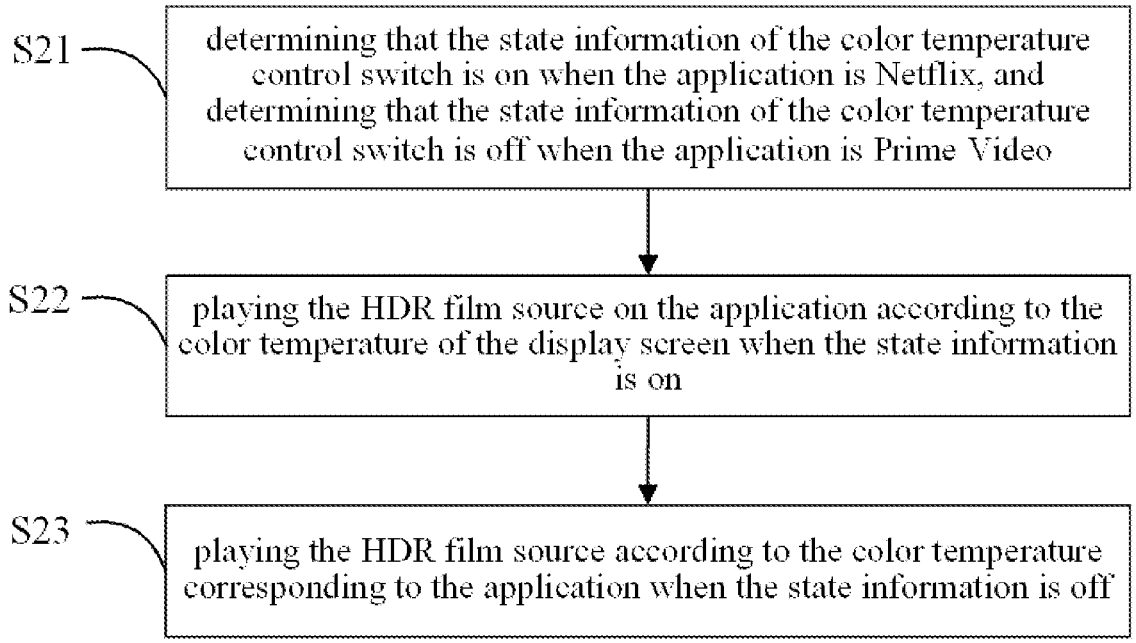
FIG. 4 is a schematic flowchart of the HDR film source playing method according to a third embodiment of the present disclosure.

As shown in FIG. 4, FIG. 4 is a schematic flowchart of the HDR film source playing method according to a third embodiment of the present disclosure. In this embodiment, the HDR film source playing method includes the following operations:

Operation S21, determining that the state information of the color temperature control switch is on when the application is Netflix, and determining that the state information of the color temperature control switch is off when the application is Prime Video;

Operation S22, playing the HDR film source on the application according to the color temperature of the display screen when the state information is on; and Operation S23, playing the HDR film source according to the color temperature corresponding to the application when the state information is off.

This embodiment is mainly aimed at overseas projects with Netflix and Prime Video at the same time. In order to quickly pass the image quality certification without affecting each other's image quality effects, it is necessary to quickly switch the corresponding HDR color temperature mechanism under different applications. In overseas Netflix projects, all applications are in the same image mode, and the software only calls a set of gamma values and a set of white balance. It is not feasible to use different gamma values and white balances in different applications to achieve HDR color temperature switching. At this time, a macro or flag bit is added, different applications are entered through the switch of the macro or flag bit to achieve fast switching of HDR color temperature. Since Prime Video's required color temperature to play HDR film source is D65, Netflix's required color temperature to play HDR film source is the color temperature of the display screen. And usually, D65 is the default color temperature. Therefore, when the application is Netflix, it is determined that the state information of the color temperature control switch is on, and when the application is Prime Video, it is determined that the state information of the color temperature control switch is off. HDR film source playing is performed on the application according to the color temperature of the display screen when the state information is on; and HDR film source playing is performed according to the color temperature corresponding to the application when the state information is off. Specially, an authentication image mode is selected and the white balance value is set to the Bypass state (that is, no processing, such as setting the RGB values to the default value of 1024). Then, a gamma curve with a gamma value of 2.2 is corrected according to the color temperature of the display screen, and the color coordinates of the display screen are measured, to fill in the corresponding coordinates (Wx, Wy) and (SourceX, SourceY), so that the coordinate value of (SourceX, SourceY) is consistent with the coordinate value of (Wx, Wy). (Wx, Wy) are the white color temperature coordinates of the display screen, (SourceX, SourceY) are the white color temperature coordinates of the video signal source, and in this embodiment refer to the D65 color coordinates. In the default state, the color temperature control switch is turned off, according to the D65 color temperature coordinates (x: 0.3127, y: 0.329), an HDR PQ Gamma curve that meets the D65 color temperature is automatically generated. At this time, the HDR color temperature is D65, which meets Prime Video's requirements for HDR image quality. If the Netflix application is entered, before playing the HDR film source, the color temperature control switch will be turned on. According to the color coordinates of the display screen, an HDR PQ Gamma curve is generated and then the HDR film source is played, and the color temperature meets Netflix's requirements for HDR image quality. In this way, the color temperature when playing HDR film sources under different applications can be well controlled to meet the color temperature requirements of different applications, so that they can pass the HDR image quality certification smoothly without affecting each other's image quality effects.

In this embodiment, the method includes: determining that the state information of the color temperature control switch is on when the application is Netflix, and determining that the state information of the color temperature control switch is off when the application is Prime Video; playing the HDR film source on the application according to the color temperature of the display screen when the state information is on; and playing the HDR film source according to the color temperature corresponding to the application when the state information is off. So as to solve the problem of color temperature conversion when playing HDR sources in overseas projects with Netflix and Prime Video at the same time. The color temperature control switch realizes the rapid conversion of color temperature, so as to meet the color temperature requirements of different applications when playing HDR film sources, so that they can pass the image quality certification smoothly, and the image quality effects between different applications will not affect each other.

Besides, the present disclosure further provides an HDR film source playing device, including a memory, a processor, and an HDR film source playing program stored in the memory and executable on the processor, when the HDR film source playing program is executed by the processor, the operations of the HDR film source playing method described above are implemented.

Besides, the present disclosure further provides a computer-readable storage medium. An HDR film source playing program is stored on the computer-readable storage medium, when the HDR film source playing program is executed by a processor, the operations of the HDR film source playing method described above are implemented.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present disclosure can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, a TV, or a network device, or the like) to execute the method described in each embodiment of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A high-dynamic range (HDR) film source playing method, comprising following operations:
   determining state information of a color temperature control switch according to an application that is currently opened;
   playing an HDR film source on the application according to a color temperature of a display screen when the state information is on; and
   playing the HDR film source according to a color temperature corresponding to the application when the state information is off;
   wherein the operation of determining state information of a color temperature control switch according to an application that is currently opened comprises:
   determining whether the color temperature required by the application to play the HDR film source is consistent with the color temperature of the display screen;
   when the color temperature required by the application to play the HDR film source is consistent with the color temperature of the display screen, determining state information of a color temperature conversion switch to be on; and
   when the color temperature required by the application to play the HDR film source is inconsistent with the color temperature of the display screen, determining the state information of the color temperature conversion switch to be off.

2. The HDR film source playing method of claim 1, wherein the operation of playing an HDR film source on the application according to a color temperature of a display screen comprises:
   obtaining a color temperature parameter of the display screen;
   configuring a current color temperature parameter according to the color temperature parameter of the display screen to obtain a configured first color temperature parameter; and
   playing the HDR film source on the application according to the first color temperature parameter.

3. The HDR film source playing method of claim 2, wherein the operation of playing the HDR film source on the application according to the first color temperature parameter comprises:
   generating a first gamma curve according to the first color temperature parameter;
   performing color temperature correction according to the first gamma curve to obtain a corrected first color temperature; and
   playing the HDR film source on the application according to the first color temperature.

4. The HDR film source playing method of claim 2, wherein the operation of obtaining a color temperature parameter of the display screen comprises:
   correcting the color temperature of the display screen according to a preset gamma value to obtain a color temperature parameter corresponding to a corrected color temperature;
   determining the color temperature parameter corresponding to the corrected color temperature as the color temperature parameter of the display screen; and obtaining the determined color temperature parameter of the display screen.

5. The HDR film source playing method of claim 1, wherein the operation of playing the HDR film source according to the color temperature corresponding to the application comprises:
  determining a color temperature parameter of the color temperature required by the application to play the HDR film source;
  configuring a current color temperature parameter according to the color temperature parameter of the color temperature required to play the HDR film source, to obtain a configured second color temperature parameter; and
  playing the HDR film source on the application according to the second color temperature parameter.

6. The HDR film source playing method of claim 5, wherein the operation of playing the HDR film source on the application according to the second color temperature parameter comprises:
  generating a second gamma curve according to the second color temperature parameter;
  performing color temperature correction according to the second gamma curve to obtain a corrected second color temperature; and
  playing the HDR film source on the application according to the second color temperature.

7. The HDR film source playing method of claim 1, wherein the operation of determining state information of a color temperature control switch according to an application that is currently opened comprises:
  determining that the state information of the color temperature control switch is on when the application is Netflix; and
  determining that the state information of the color temperature control switch is off when the application is Prime Video.

8. An HDR film source playing device, comprising a memory, a processor, and an HDR film source playing program stored in the memory and executable on the processor, when the HDR film source playing program is executed by the processor, following operations are implemented:
  determining state information of a color temperature control switch according to an application that is currently opened;
  playing an HDR film source on the application according to a color temperature of a display screen when the state information is on; and
  playing the HDR film source according to a color temperature corresponding to the application when the state information is off;
  wherein the operation of determining state information of a color temperature control switch according to an application that is currently opened comprises:
  determining whether the color temperature required by the application to play the HDR film source is consistent with the color temperature of the display screen;
  when the color temperature required by the application to play the HDR film source is consistent with the color temperature of the display screen, determining state information of a color temperature conversion switch to be on; and
  when the color temperature required by the application to play the HDR film source is inconsistent with the color temperature of the display screen, determining the state information of the color temperature conversion switch to be off.

9. The HDR film source playing device of claim 8, wherein the operation of playing an HDR film source on the application according to a color temperature of a display screen comprises:
  obtaining a color temperature parameter of the display screen;
  configuring a current color temperature parameter according to the color temperature parameter of the display screen to obtain a configured first color temperature parameter; and
  playing the HDR film source on the application according to the first color temperature parameter.

10. The HDR film source playing device of claim 9, wherein the operation of playing the HDR film source on the application according to the first color temperature parameter comprises:
  generating a first gamma curve according to the first color temperature parameter;
  performing color temperature correction according to the first gamma curve to obtain a corrected first color temperature; and
  playing the HDR film source on the application according to the first color temperature.

11. The HDR film source playing device of claim 9, wherein the operation of obtaining a color temperature parameter of the display screen comprises:
  correcting the color temperature of the display screen according to a preset gamma value to obtain a color temperature parameter corresponding to a corrected color temperature;
  determining the color temperature parameter corresponding to the corrected color temperature as the color temperature parameter of the display screen; and
  obtaining the determined color temperature parameter of the display screen.

12. The HDR film source playing device of claim 8, wherein the operation of playing the HDR film source according to the color temperature corresponding to the application comprises:
  determining a color temperature parameter of the color temperature required by the application to play the HDR film source;
  configuring a current color temperature parameter according to the color temperature parameter of the color temperature required to play the HDR film source, to obtain a configured second color temperature parameter; and
  playing the HDR film source on the application according to the second color temperature parameter.

13. A non-transitory computer-readable storage medium, wherein an HDR film source playing program is stored in the non-transitory computer-readable storage medium, when the HDR film source playing program is executed by a processor, following operations are implemented:
  determining state information of a color temperature control switch according to an application that is currently opened;
  playing an HDR film source on the application according to a color temperature of a display screen when the state information is on; and
  playing the HDR film source according to a color temperature corresponding to the application when the state information is off;

wherein the operation of determining state information of a color temperature control switch according to an application that is currently opened comprises:

determining whether the color temperature required by the application to play the HDR film source is consistent with the color temperature of the display screen;

when the color temperature required by the application to play the HDR film source is consistent with the color temperature of the display screen, determining state information of a color temperature conversion switch to be on; and when the color temperature required by the application to play the HDR film source is inconsistent with the color temperature of the display screen, determining the state information of the color temperature conversion switch to be off.

14. The non-transitory computer-readable storage medium of claim 13, wherein the operation of playing an HDR film source on the application according to a color temperature of a display screen comprises:

obtaining a color temperature parameter of the display screen;

configuring a current color temperature parameter according to the color temperature parameter of the display screen to obtain a configured first color temperature parameter; and playing the HDR film source on the application according to the first color temperature parameter.

15. The non-transitory computer-readable storage medium of claim 14, wherein the operation of playing the HDR film source on the application according to the first color temperature parameter comprises:

generating a first gamma curve according to the first color temperature parameter;

performing color temperature correction according to the first gamma curve to obtain a corrected first color temperature; and playing the HDR film source on the application according to the first color temperature.

16. The non-transitory computer-readable storage medium of claim 14, wherein the operation of obtaining a color temperature parameter of the display screen comprises:

correcting the color temperature of the display screen according to a preset gamma value to obtain a color temperature parameter corresponding to a corrected color temperature;

determining the color temperature parameter corresponding to the corrected color temperature as the color temperature parameter of the display screen; and obtaining the determined color temperature parameter of the display screen.

17. The non-transitory computer-readable storage medium of claim 13, wherein the operation of playing the HDR film source according to the color temperature corresponding to the application comprises:

determining a color temperature parameter of the color temperature required by the application to play the HDR film source;

configuring a current color temperature parameter according to the color temperature parameter of the color temperature required to play the HDR film source, to obtain a configured second color temperature parameter; and playing the HDR film source on the application according to the second color temperature parameter.

* * * * *